Patented Oct. 4, 1932                                               1,880,507

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

CELLULOSIC COMPOSITION OF MATTER CONTAINING A LOWER ALKYL ESTER OF MALONIC ACID

No Drawing.    Application filed September 16, 1930. Serial No. 482,384.

This invention relates to compositions of matter in which cellulose derivatives, such as cellulose acetate, cellulose nitrate or cellulose ether, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, photographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture. Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing use to which cellulose derivatives have been put and the increasing number of desirable properties required of the cellulose derivative for most purposes has made the discovery of new and economical plasticizers or other addition agents a matter of considerable importance to the art.

I have discovered that while malonic acid is unstable when heated, the esters of malonic acid show high stability and that valuable properties may be induced in and/or contributed to compositions containing cellulose derivatives, such as cellulose acetate, by adding thereto as a plasticizing compound one of the lower alkyl esters of malonic acid together with a solvent, such as acetone, which will dissolve both the cellulose derivative and plasticizer. The lower alkyl esters of malonic acid which I have found suitable and which are exemplary of this class of compounds which may be employed are (with their structural formulae) as follows:

Methyl malonate $\quad H_2C\begin{subarray}{l}COOCH_3\\COOCH_3\end{subarray}$

Ethyl malonate $\quad H_2C\begin{subarray}{l}COOC_2H_5\\COOC_2H_5\end{subarray}$ Ethyl diethyl malonate $\quad C_2H_5-C\begin{subarray}{l}COOC_2H_5\\COOC_2H_5\end{subarray}$
$\qquad\qquad\qquad\qquad\qquad H$ Ethyl-n-butyl malonate $\quad H_2C\begin{subarray}{l}COOC_2H_5\\COOCH_2CH_2CH_2CH_3\end{subarray}$ Ethyl iso-butyl malonate $\quad H_2C\begin{subarray}{l}COOC_2H_5\\COOCH_2\ CH\begin{subarray}{l}CH_3\\CH_3\end{subarray}\end{subarray}$ Ethyl secondary butyl malonate $H_2C\begin{subarray}{l}COOC_2H_5\\COO\ CH\begin{subarray}{l}C_2H_5\\CH_3\end{subarray}\end{subarray}$ Ethyl di-n-butyl malonate $\quad\begin{subarray}{l}H\\C_2H_5\end{subarray}\begin{subarray}{l}COO\ CH_2CH_2CH_2CH_3\\COO\ CH_2CH_2CH_2CH_3\end{subarray}$ These malonates are compatible with cellulose derivatives and particularly compatible with cellulose acetate in the percentage hereinafter given. They are not expensive compounds and not particularly difficult to produce, or obtain upon the open market. The particularly useful properties which they induce in or contribute to a cellulose composition containing one of them are hereinafter enumerated.

In order that those skilled in this art may better understand my invention I would state, by way of illustration, that for the manufacture of photographic film or other sheets my new composition of matter may be compounded as follows: 100 parts of acetone soluble cellulose acetate i. e. cellulose acetate containing from 38% to 42% acetyl radical, approximately, is dissolved with stirring at atmospheric temperature in 300 to 500 parts, preferably 400 parts, by weight, of acetone. To this solution may be added from 10 to 50 parts by weight, of one of the lower alkyl esters of malonic acid, it being found preferable to employ approximately 30 to 40 parts thereof. Within the limits stated, the amount of plasticizer may be decreased or increased, depending upon whether it is desired to decrease or increase, respectively, the properties which this plasticizer contributes to the finished product. The amount of solvent employed may also be decreased or increased, depending upon whether it is desired to have a more or less freely flowing composition, respectively.

In the case of most of the malonates named there could be incorporated in the cellulosic composition from 10 to 50 parts of the malonate for every 100 parts of the cellulose derivative, such for instance, as cellulose acetate. It was found that in most compositions for producing film that from about 20 to 40 parts of the malonate for every 100 parts of cellulose derivative such as cellulose acetate was the optimum proportion to employ to obtain clear films of good flexibility. In the single case of ethyl di-n-butyl malonate a hazy film was obained where more than 20 parts of the malonate was employed although this may be remedied at times by the addition of other compounds. I also found that where more than about 20% of ethyl malonate was employed, a film of superior flatness resulted. Furthermore, it is to be noted that the matter of haze is not objectionable where clarity is not important as in the case of photographic film or the like; in fact translucency is sometimes sought in preference to transparency.

A composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is exceedingly tough and flexible, as shown by the fact that it will withstand many folds upon a modified Schopper fold-tester (commonly used for such purposes) without breaking and that even after being subjected for a considerable number of days to air maintained at a temperature of 65° C. the film still maintains flexibility (in contrast to almost complete lack of flexibility where no plasticizer is used) demonstrating that the film will withstand ordinary usage satisfactorily for many years. In fact as compared to a check which was unplasticized and became brittle in 30 days, I found that film plasticized with ethyl or methyl malonate maintained flexibility at 65° C. for as much as 100 days. The sum total of the above advantageous properties of a product produced from my new composition is considerably in excess of that of products produced with what have previously been regarded as the better plasticizers.

Other similar solvents (instead of acetone) which are compatible with the cellulose acetate and my new plasticizer may also occur to those skilled in this art. In like manner this plasticizer may be compounded with other single organic esters of cellulose, such as cellulose propionate, butyrate and the like, or with mixed organic and/or inorganic esters, such as cellulose aceto-stearate, aceto-malate, or cellulose nitro-acetate or with cellulose nitrate, or with the cellulose ethers, a suitable solvent which will dissolve both the cellulosic derivative and the plasticizer being employed. It will also be noted that I have above disclosed mixed alkyl esters as well as di-alkyl or single alkyl esters of malonic acid and that they are all to be included within the terminology "lower alkyl esters of malonic acid" or the like.

Inasmuch as my above described composition of matter is quite useful in the production of films and sheets it will be apparent that my new plasticizer may also be employed with advantage in the other branches of the plastic art. For instance, my above described composition of matter may be employed in the manufacture of artificial silk by the dry spinning method. With the proper coagulating bath it may also be employed for wet spinning. It may be desired to employ a composition of different viscosity or evaporation characteristics but this is a mere matter of changing the solvent proportion or adding evaporation retardents or other high or intermediate boiling constituents, as has been well known in the art for more than a decade. My novel plasticizer may also be employed with advantage in connection with a number of the known lacquer and varnish formulæ with which it may be found to be compatible. In such cases the plasticizer is usually first put into solution with the cellulose derivative solution and if non-solvents are added for the purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

What I claim as my invention, and desire to be secured by Letters Patent of the United States, is:

1. A composition of matter comprising a cellulose derivative and a lower alkyl ester of malonic acid.

2. A composition of matter comprising cellulose acetate and a lower alkyl ester of malonic acid.

3. A composition of matter comprising 100 parts cellulose acetate and from about 10 to 60 parts, by weight, of a lower alkyl ester of malonic acid.

4. A composition of matter comprising 100 parts of cellulose acetate and approximately 30 parts, by weight, of a lower alkyl ester of malonic acid.

5. A composition of matter comprising a cellulose derivative and methyl malonate.

6. A composition of matter comprising cellulose acetate and methyl malonate.

7. A composition of matter comprising a cellulose derivative and ethyl malonate.

8. A composition of matter comprising cellulose acetate and ethyl malonate.

9. A composition of matter comprising cellulose acetate and about 30 parts by weight of methyl malonate.

10. A composition of matter comprising cellulose acetate and about 30 parts by weight of ethyl malonate.

Signed at Rochester, New York, this 6th day of September, 1930.

HENRY B. SMITH.

Certificate of Correction

Patent No. 1,880,507.

October 4, 1932.

HENRY B. SMITH

It is hereby certified that error appears in the printed specification of the above-numbered patent requiring correction as follows: Page 1, line 98, for the last " CH " of formula read $CH_3$; and that the said Letters Patent should be read with this correction therein that the same may conform to the record of the case in the Patent Office.

Signed and sealed this 13th day of December, A. D. 1932.

[SEAL.]

M. J. MOORE,
*Acting Commissioner of Patents.* purpose of cheapening the composition they are added only to such an extent as will not precipitate the derivative from solution. Also the plasticizer is usually employed in larger amounts, such as from 50 to 60 parts, in compounding lacquers. Other uses within the scope of my invention will also suggest themselves to those skilled in the art and are to be included within the scope of the claims appended hereto.

What I claim as my invention, and desire to be secured by Letters Patent of the United States, is:

1. A composition of matter comprising a cellulose derivative and a lower alkyl ester of malonic acid.

2. A composition of matter comprising cellulose acetate and a lower alkyl ester of malonic acid.

3. A composition of matter comprising 100 parts cellulose acetate and from about 10 to 60 parts, by weight, of a lower alkyl ester of malonic acid.

4. A composition of matter comprising 100 parts of cellulose acetate and approximately 30 parts, by weight, of a lower alkyl ester of malonic acid.

5. A composition of matter comprising a cellulose derivative and methyl malonate.

6. A composition of matter comprising cellulose acetate and methyl malonate.

7. A composition of matter comprising a cellulose derivative and ethyl malonate.

8. A composition of matter comprising cellulose acetate and ethyl malonate.

9. A composition of matter comprising cellulose acetate and about 30 parts by weight of methyl malonate.

10. A composition of matter comprising cellulose acetate and about 30 parts by weight of ethyl malonate.

Signed at Rochester, New York, this 6th day of September, 1930.

HENRY B. SMITH.

Certificate of Correction

Patent No. 1,880,507.  October 4, 1932.

HENRY B. SMITH

It is hereby certified that error appears in the printed specification of the above-numbered patent requiring correction as follows: Page 1, line 98, for the last " CH " of formula read $CH_3$; and that the said Letters Patent should be read with this correction therein that the same may conform to the record of the case in the Patent Office.

Signed and sealed this 13th day of December, A. D. 1932.

[SEAL.]

M. J. MOORE,
*Acting Commissioner of Patents.*

Certificate of Correction

Patent No. 1,880,507. October 4, 1932.

HENRY B. SMITH

It is hereby certified that error appears in the printed specification of the above-numbered patent requiring correction as follows: Page 1, line 98, for the last "CH" of formula read $CH_3$; and that the said Letters Patent should be read with this correction therein that the same may conform to the record of the case in the Patent Office.

Signed and sealed this 13th day of December, A. D. 1932.

[SEAL.]

M. J. MOORE,
*Acting Commissioner of Patents.*